UNITED STATES PATENT OFFICE.

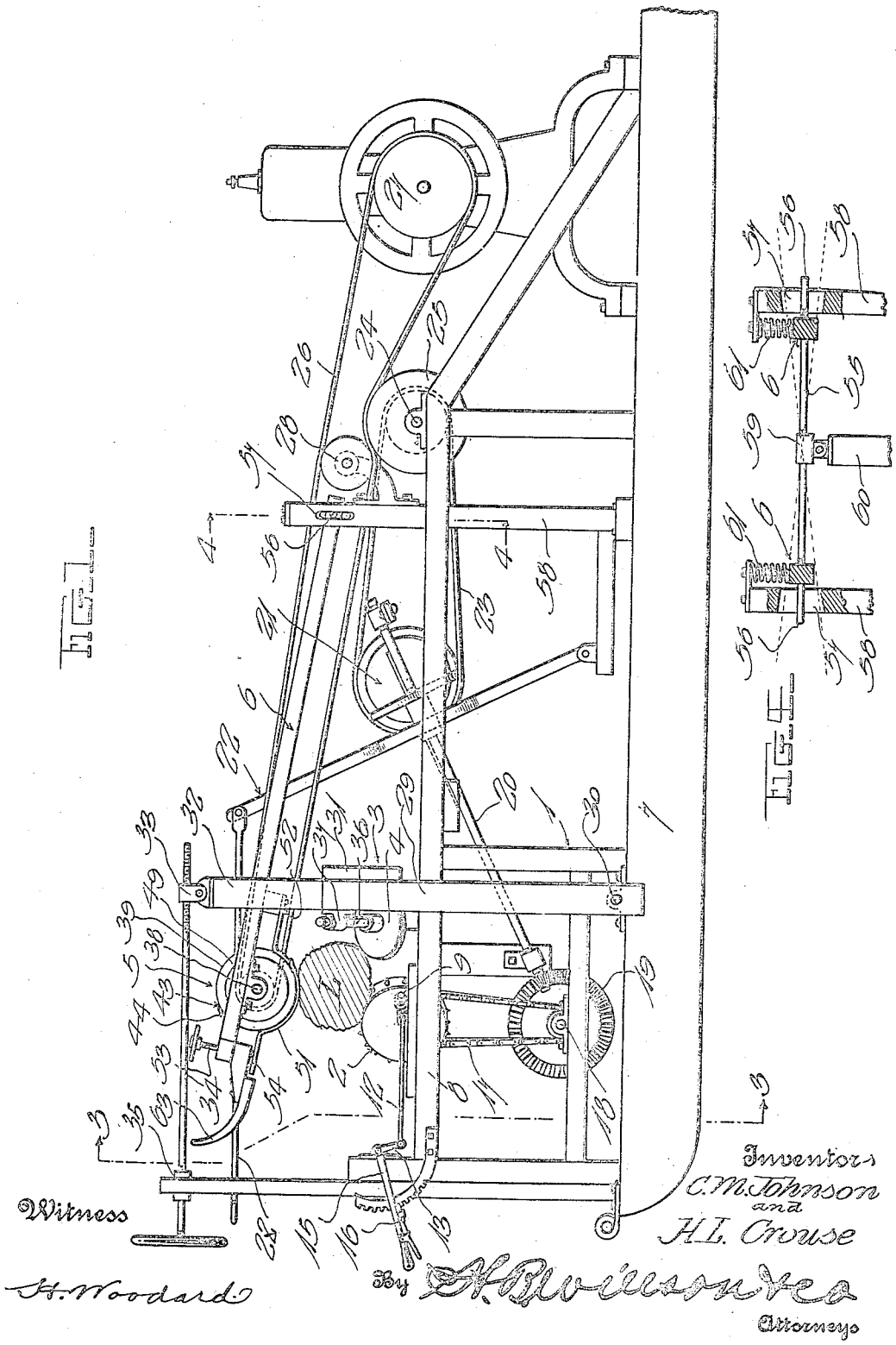

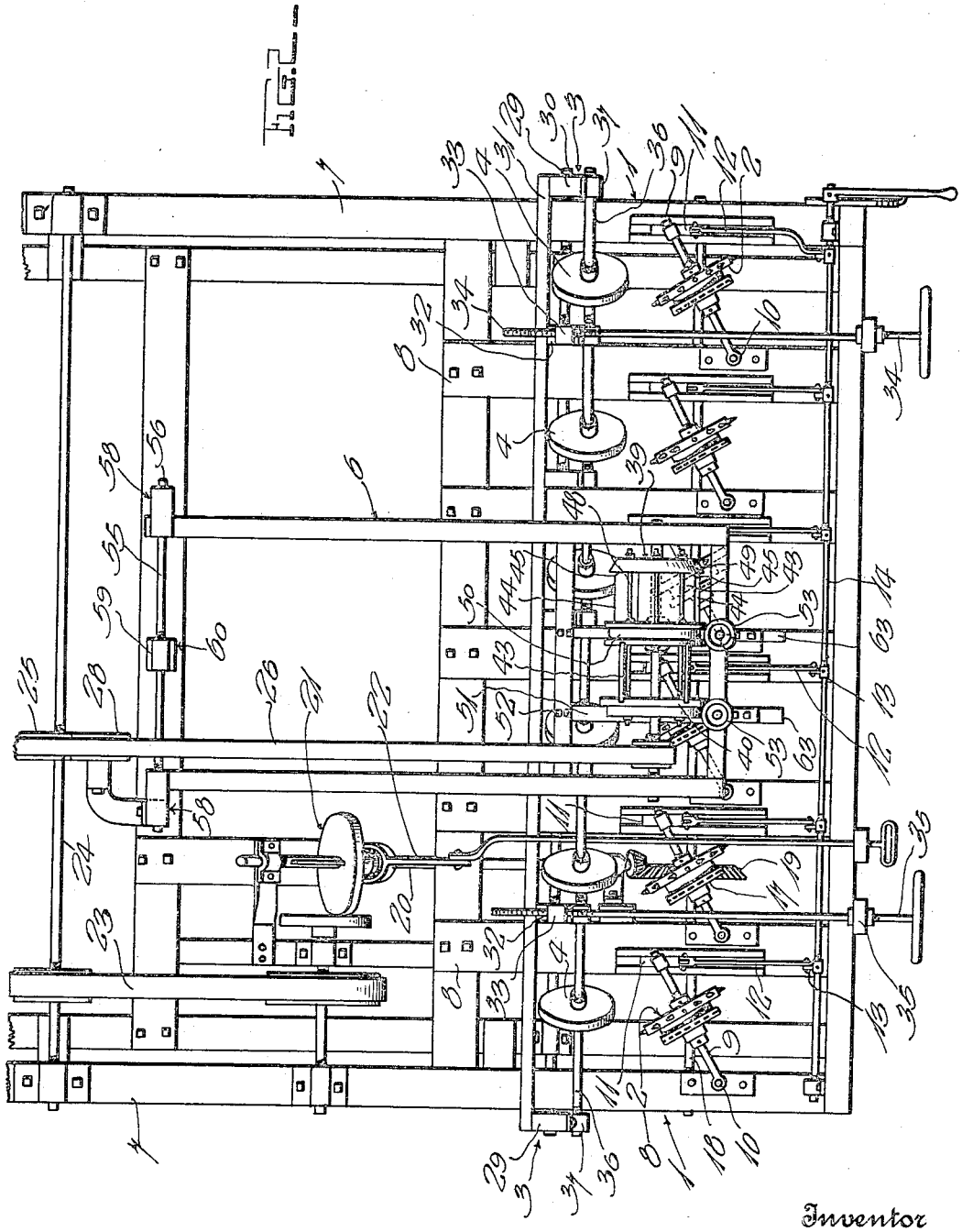

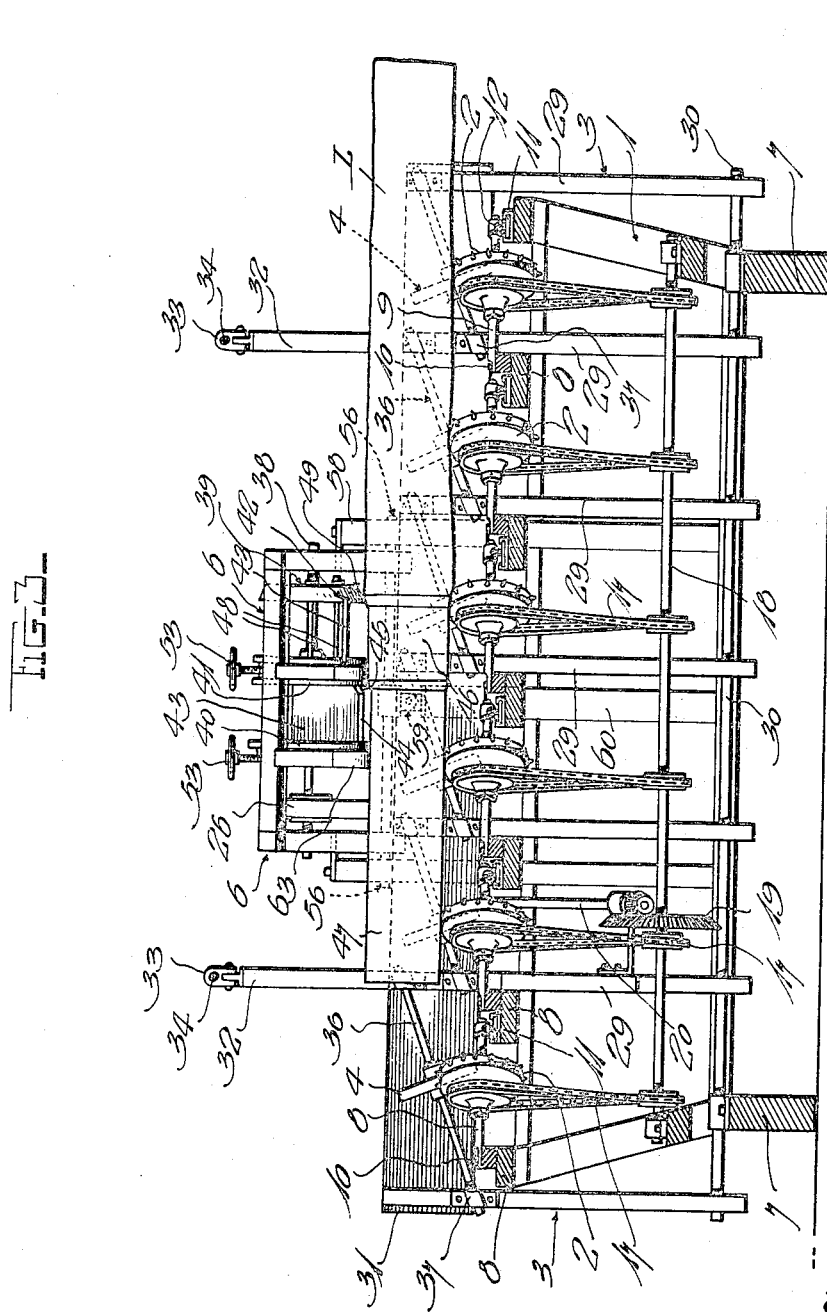

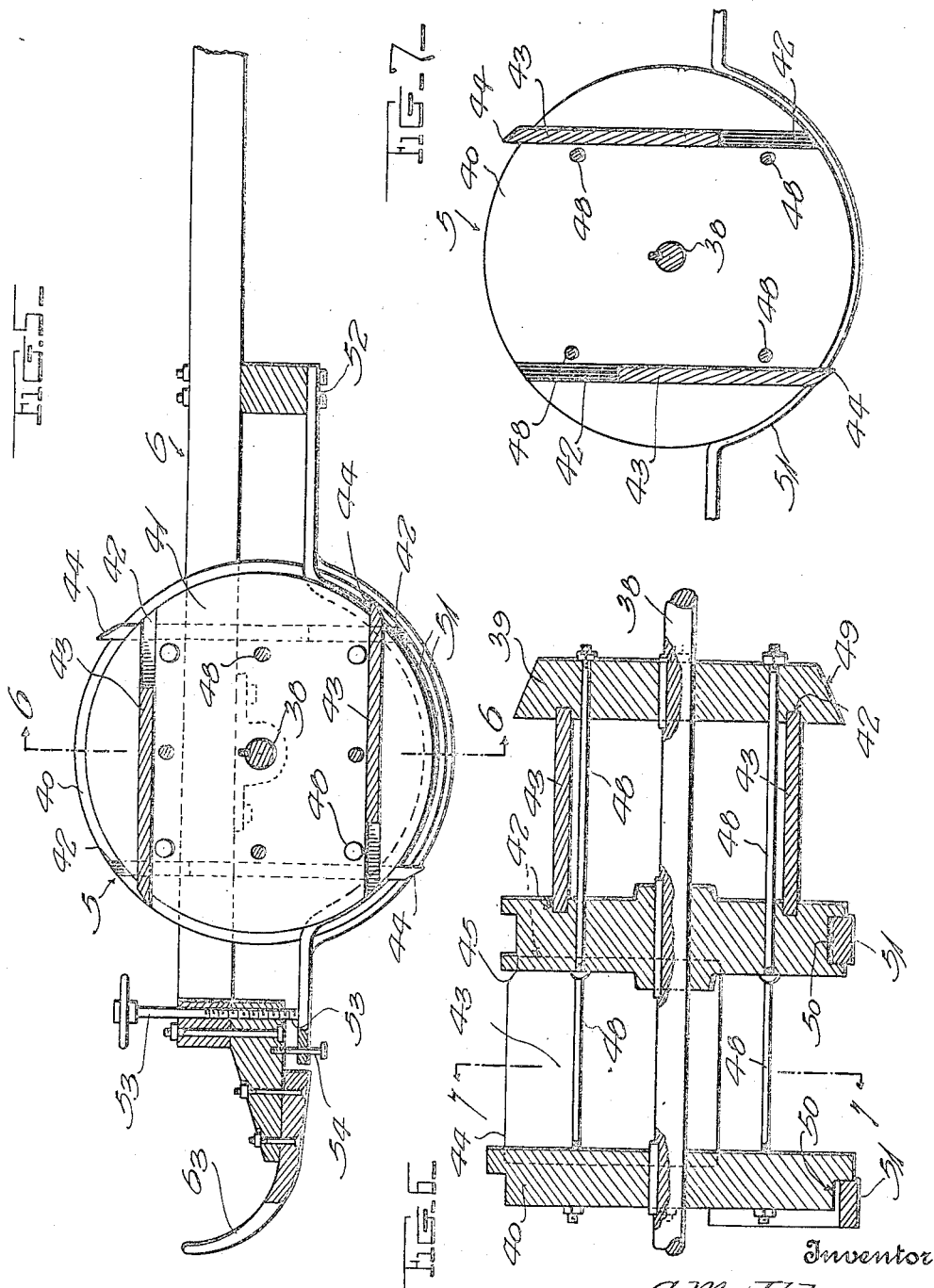

CARL M. JOHNSON AND HERBERT L. CROUSE, OF CARIBOU, MAINE.

BARK-REMOVING MACHINE.

1,294,275. Specification of Letters Patent. Patented Feb. 11, 1919.

Application filed April 29, 1918. Serial No. 231,472.

*To all whom it may concern:*

Be it known that we, CARL M. JOHNSON and HERBERT L. CROUSE, citizens of the United States, residing at Caribou, in the county of Aroostook and State of Maine, have invented certain new and useful Improvements in Bark-Removing Machines; and we do declare the following to be a full, clear, and exact description of the invention, such as will enable others skilled in the art to which it appertains to make and use the same.

Our invention has for its object to provide a comparatively simple and inexpensive, yet a highly efficient and durable machine for removing bark from logs, particularly from pulp wood from which paper and other products are to be manufactured.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of the machine;

Fig. 2 is a top plan view thereof;

Fig. 3 is a vertical transverse section as indicated by the lines 3—3 of Fig. 1;

Fig. 4 is a detail vertical transverse section on the plane of the line 4—4 of Fig. 1;

Fig. 5 is a vertical transverse section of the bark removing cutter and a longitudinal section of the frame carrying said cutter;

Fig. 6 is a longitudinal section of the cutter on the plane indicated by the line 6—6 of Fig. 5; and Fig. 7 is a transverse section on the plane indicated by the line 7—7 of Fig. 6.

Briefly speaking, the machine comprises a main frame 1, a plurality of feed wheels 2 mounted on said frame, a vertically disposed swinging frame 3, wheels 4 mounted on said frame 3 and coacting with the feed wheels 2 in guiding the logs L and feeding them longitudinally as the bark is removed, a rotary cutter 5 for removing the bark, and a vertically swinging and laterally tilting frame 6 carrying said rotary cutter, together with the several novel features of construction to be hereinafter described in detail.

The frame 1 is mounted on skids 7 or in any other preferred manner for rendering the same easily portable from place to place, and said frame includes a plurality of parallel horizontal bars 8 located at one end thereof as seen most clearly in Figs. 1, 2 and 3. The wheels 2 are located between these bars 8 and are mounted on horizontal shafts 9 disposed at an angle to the longitudinal axis of the machine, said shafts being pivotally mounted at one end as seen at 10 and having their other ends suitably connected to slides 11, both the pivots and the slides being carried by the bars 8. Links 12 are connected with the slides 11 at one end and at their other ends are similarly connected to crank arms 13 on a transverse rock shaft 14 mounted at one end of the machine. A hand lever or the like 15 is provided for turning the shaft 14 at will, and an appropriate dog 16 or other preferred means is employed to lock the shaft in any position. It will thus be seen that by rocking the shaft to the proper extent, the angle at which the wheels 2 are set may be readily varied as occasion may demand, thus making it possible to feed the logs through the machine with more or less speed as may be most advantageous.

Suitable sprocket wheels and sprocket chains 17 are shown for driving the wheels 2 from a transverse shaft 18 beneath them, said shaft being driven by appropriate gearing 19 from a longitudinal shaft 20 having a friction drive 21 including operating connections 22 for varying the speed at which the shaft 20 is driven. For operating the friction drive 21, a belt 23 is provided, said belt being driven from a transverse shaft 24 having thereon a pulley 25 over which a belt 26 passes, said belt being driven by a suitable engine or the like 27 and serving also to drive the cutter 5 in a manner to be set forth. The belt 26 merely passes over the pulley 25 and is held in engagement therewith by an idler 28 as shown most clearly in Fig. 1.

The tilting frame 3 seen more particularly in Figs. 1, 2 and 3 includes a plurality of vertical bars 29 pivotally mounted at their lower ends on a transverse shaft 30, the upper ends of said bars being secured to a board or the like 31. Two of the bars 29 extend above the board 31 as seen at 32 and are provided on their upper ends with nuts 33 through which appropriate adjusting screws 34 are threaded, said screws being rotatably but non-slidably mounted at 35. By adjusting the screws 34, it will be obvious that the frame 3 may be tilted either toward or away from the feed wheels 2, so that the guiding and supporting wheels 4 will be correspondingly moved according to the size of the log L. These wheels 4, reference being still made more particularly to Figs. 1, 2 and 3, are mounted at the centers of inclined shafts 36 whose ends are connected to the bars 29 by appropriate bearings or the like 37, and the angular disposition of the wheel is preferably such as to assist the wheels 2 in feeding the logs longitudinally as the bark is removed therefrom.

The cutter 5 seen most clearly in Figs. 5, 6 and 7, includes a central shaft 38 mounted transversely on the frame 6 and driven by the belt 26 above described. Rigidly keyed on shaft 38 are two circular end castings 39 and 40 and a central casting 41, the several castings having transverse grooves 42 in their adjacent faces which receive blades 43 arranged in stepped relation and provided with sharpened edges 44 angled at one end as seen at 45, whereby one series of blades 43 will remove the rough outer bark as seen at 46 in Fig. 3, while the other series of blades will remove the remainder of the bark as shown at 47 in the same figure. Tie bolts 48 are provided for securing the two end castings 39 and 40 to the central casting 41 and it will be obvious that by loosening these bolts, the blades 43 may be adjusted or removed for sharpening.

The peripheral edge of casting 39 is preferably beveled at 49 for proper presentation to the work and the periphery of each of the castings 40 and 41 is provided with a circumferential groove 50. These grooves receive therein substantially semi-circular gage bars 51 which extend under the cutter for engagement with the logs to regulate the depth of cut. At 52, one end of the bars 51 is rigidly secured to the frame 6, while adjusting screws or the like 53 are provided to force the other ends of said bars downwardly away from the frame as occasion may demand, so that the depth of cut may be varied. For the last named ends of the bars 51, guide studs 54 (Fig. 5) are preferably employed, to prevent lateral shifting of said bars which would cause them to bind against the walls of the grooves 50. It will be observed that the two gage bars 51 are spaced apart longitudinally of the cutter 5 and that the latter is elongated longitudinally of the logs' path. By this arrangement, the gages control the lateral tilting of the frame 6 which permits the cutter to readily follow irregularities in the logs, so that all bark will be removed.

The frame 6 is of any preferred construction and at its rear end is shown provided with a transverse shaft 55 whose projecting ends form projections 56 received in vertical guide slots 57 (Figs. 1 and 4) formed in standards 58 of the frame 1. At 59, the center of shaft 55 is pivoted to a vertical post 60 on an axis extending longitudinally of the frame 6, and it is upon this pivot 59 that the frame 6 tilts, the projections 56 then moving vertically in the slots 57 as indicated by the dotted lines in Fig. 4. To control this movement more or less, coiled springs 61 are provided. In addition to permitting lateral tilting of the frame 6, it will be obvious that the shaft 55 allows said frame to swing vertically so that the cutter 5 may rest on the log regardless of its size or irregularities.

At 63 (Figs. 1, 2, 3 and 5) are shown upwardly curving shoes on the free end of the frame 6. These shoes are intended to raise frame 6 when a log is forced under them, over the feed wheels 2 and into the proper place to be peeled, that is, on the two sets of wheels 2 and 4.

In operation, after the necessary adjustments have been made, the logs L are placed upon the wheels 2 and 4, said wheels now serving to feed the logs beneath the cutter 5, said logs being at the same time rotated by the spurs on the periphery of the wheels 2. The cutter 5 follows all irregularities of the log and removes the bark cleanly therefrom. Suitable means (not shown) may be provided for carrying off the bark and it is obvious that the stripped log will leave the machine at the opposite side from which it enters, that is, at the left of Figs. 2 and 3. Whenever expedient, the angle of the wheels 2 may be varied and the frame 3 may be swung forwardly or rearwardly according to the size of the log.

We have indicated a common type of gasolene motor for driving the machine, but we wish it understood that any suitable or preferred power could well be employed and our invention is not restricted to the use of any details or arrangements except as set forth in the appended claims, considerable latitude being allowed for the making of numerous minor changes which occasion may dictate.

We claim:

1. In a machine for removing bark from logs, the combination of means for moving the logs longitudinally, a cutter elongated longitudinally of the logs' path for removing the bark from the logs, an elongated frame on one end of which said cutter is mounted transversely, lateral projections on the other end of said frame, and fixed elongated guides in which said projections are movable laterally to permit lateral tilting of the frame.

2. A structure as specified in claim 1, together with spring means for controlling the movement of said projections in said guides.

3. A structure as specified in claim 1, together with a central bearing at said last named end of the frame upon which the latter tilts.

4. A structure as specified in claim 1, together with a central bearing at said last named end of the frame upon which the latter tilts, and spring means for controlling the tilting of said frame.

5. In a machine for removing bark from logs, the combination of means for moving the logs longitudinally, a cutter elongated longitudinally of the logs' path for removing the bark from the logs, an elongated frame on one end of which said cutter is mounted transversely, a transverse shaft on the other end of said frame, elongated guides in which the ends of said shaft are received slidably to permit lateral tilting of the frame, and pivotal mounting means for the center of said shaft located on an axis extending longitudnally of said frame.

6. A structure as specified in claim 5, and spring means controlling the tilting of said shaft.

7. In a machine for removing the bark from logs, a cutter for removing the bark, means for guiding and feeding the logs along as the bark is removed, said means including a plurality of spaced wheels to engage the logs, a laterally swinging vertical frame including spaced vertical bars, inclined shafts for said wheels mounted at their ends on said vertical bars and means for swinging said frame laterally according to the size of the logs.

8. In a machine for removing bark from logs, bark removing means, means for guiding and feeding the logs longitudinally as the bark is removed, including a plurality of feed wheels disposed at an angle to the logs' path, a drive shaft adjacent said wheels, and driving connections between said shaft and wheels; oblique shafts on the centers of which said wheels are mounted, said shafts extending substantially in longitudinal directions with respect to the logs' path and being pivotally mounted at one end, and means connected to the other ends of said shafts for swinging them toward or away from the logs' path.

9. In a machine for removing bark from logs, bark removing means, means for guiding and feeding the logs longitudinally as the bark is removed, including a plurality of feed wheels disposed at an angle to the logs' path, a drive shaft adjacent said wheels and driving connections between said shaft and wheels; oblique shafts on the centers of which said wheels are mounted, said shafts extending in substantially longitudinal directions with respect to the logs' path and being pivotally mounted at one end, slides to which the other ends of said shafts are connected, a plurality of links extending from said sides, and a longitudinal rock shaft having crank arms to which said links are connected, whereby the shafts may be swung simultaneously toward or away from the logs' path, and means for locking said rock shaft.

10. In a machine for removing the bark from logs, means for removing the bark, a frame extending transversely of the logs' path and carrying said bark removing means, said frame being mounted on an axis transverse to the logs' path, and a pair of gages carried by said frame and spaced apart longitudinally of the logs' path to regulate the depth of cut and to control the tilting of the frame according to irregularities in the logs.

11. In a machine for removing bark from logs, a rotary cutter for removing the bark, said cutter including a circular blade holding member having in its periphery a circumferential groove, a frame carrying said cutter, and a semi-circular gage bar carried by said frame and received in said groove, said bar being disposed for engagement with the log to regulate the depth of cut.

12. In a machine for removing bark from logs, a rotary cutter for removing the bark, said cutter including a pair of end castings and a central casting between which the cutter blades are clamped, said central casting and one of said end castings having circumferential grooves, a frame carrying said cutter, and a pair of semi-circular gage bars carried by said frame and received in said grooves, said bars being disposed for engagement with the log to regulate the depth of cut.

In testimony whereof we have hereunto set our hands.

CARL M. JOHNSON.
HERBERT L. CROUSE.